(12) United States Patent
Yamakado

(10) Patent No.: US 8,136,032 B2
(45) Date of Patent: Mar. 13, 2012

(54) DOCUMENT EDIT SUPPORT DEVICE AND STORAGE MEDIUM

(75) Inventor: Hitoshi Yamakado, Hino (JP)

(73) Assignee: Seiko Epson Corporation (JP)

( * ) Notice: Subject to any disclaimer, the term of this patent is extended or adjusted under 35 U.S.C. 154(b) by 1039 days.

(21) Appl. No.: 12/011,911

(22) Filed: Jan. 30, 2008

(65) Prior Publication Data

US 2008/0195937 A1 Aug. 14, 2008

(30) Foreign Application Priority Data

Feb. 14, 2007 (JP) ................................. 2007-033888

(51) Int. Cl.
*G06F 17/00* (2006.01)
(52) U.S. Cl. .......................... 715/243; 715/255; 715/273
(58) Field of Classification Search .......... 715/243–247, 715/253–256
See application file for complete search history.

(56) References Cited

U.S. PATENT DOCUMENTS

| | | | |
|---|---|---|---|
| 5,428,733 A * | 6/1995 | Carr ............................... | 715/809 |
| 2003/0229856 A1 | 12/2003 | Lynn et al. | |
| 2005/0091599 A1* | 4/2005 | Yamakado et al. ............ | 715/732 |
| 2005/0183009 A1* | 8/2005 | Hannebauer et al. ......... | 715/517 |
| 2006/0174568 A1 | 8/2006 | Kinoshita et al. | |
| 2006/0259872 A1 | 11/2006 | Mullen et al. | |
| 2008/0024501 A1 | 1/2008 | Yamakado et al. | |
| 2008/0024502 A1 | 1/2008 | Nagahara et al. | |

FOREIGN PATENT DOCUMENTS

| | | |
|---|---|---|
| JP | 64-17156 | 1/1989 |
| JP | 03-269678 | 12/1991 |
| JP | 08-194832 | 7/1996 |
| JP | 08-255160 | 10/1996 |
| JP | 09-270020 | 10/1997 |
| JP | 2003-523014 | 7/2003 |
| JP | 2006-184672 | 7/2006 |
| JP | 2006-185941 | 7/2006 |
| JP | 2006-189989 | 7/2006 |
| JP | 3915813 | 2/2007 |
| JP | 2008-033892 | 2/2008 |
| JP | 2008-035475 | 2/2008 |

(Continued)

OTHER PUBLICATIONS

"Stylesheet Design and Pulling Power Chapter 1 Web Layout Design", Rin Yano, web creators, MDN Corporation, Japan, Mar. 31, 2003, vol. 51, pp. 36-49 (in Japanese).

(Continued)

*Primary Examiner* — Quoc A Tran
(74) *Attorney, Agent, or Firm* — Harness, Dickey & Pierce, P.L.C.

(57) ABSTRACT

There is disclosed a document edit support device including: an object obtaining unit that obtains an object as data expressing at least one of a text and an image, which are included in a document as an edit target and are to be located in a layout area; a grid line obtaining unit that obtains a plurality of grid lines in the layout area; and a grid line selection unit that selects at least one of the plurality of grid lines selected by the grid line obtaining unit, so that a predetermined condition is satisfied by blank spaces which remain when the object obtained by the object obtaining unit is located along the selected at least one of the plurality of grid lines.

7 Claims, 11 Drawing Sheets

FOREIGN PATENT DOCUMENTS

| | | |
|---|---|---|
| JP | 2008-065587 | 3/2008 |
| JP | 2008-140158 | 6/2008 |
| JP | 2008-141495 | 6/2008 |
| JP | 2008-141496 | 6/2008 |
| JP | 2008-186332 | 8/2008 |
| JP | 2008-191746 | 8/2008 |
| JP | 2008-197835 | 8/2008 |
| JP | 2008-197990 | 8/2008 |
| JP | 2008-204173 | 9/2008 |
| JP | 2008-204179 | 9/2008 |

OTHER PUBLICATIONS

Ch'ng, E. et al., "A Dynamic Gridding System for Web Page Design Tools" pp. 138-142, Aug. 13-16, 2001.

Ch'ng, E., "Simulation of a Design Environment for Users to Incorporate Proportioning Systems Into Screen Design", Masters Thesis, Multimedia University, pp. 1-186 (Jan. 2002).

Prybyl, R., "Photoshop Scripts-Golden Ratio Grid", Internet Citation, pp. 1-2, Jul. 17, 2006.

* cited by examiner

DOCUMENT EDIT SUPPORT DEVICE AND STORAGE MEDIUM

CROSS REFERENCE TO RELATED APPLICATIONS

The entire disclosures of Japanese Patent Application No. 2007-33888 filed on Feb. 14, 2007 is expressly incorporated by reference herein.

BACKGROUND

1. Field of the Invention

The present invention relates to a technique for supporting edit of a document.

2. Description of the Related Art

There are known techniques for using a computer device to edit or create a document by laying out objects (such as digital content items) within a certain area. Guide lines are referred to when laying out objects, and grid lines are widely used as such guide lines (for example, refer to publications JP-A-8-194832, JP-B-2003-523014, JP-A-2006-189989, JP-A-64-17156, and JP-A-3-026978).

JP-A-8-194832 discloses a technique in which uniform grid lines are not used over an entire area but the size of grid lines is changed for an arbitrary area. JP-B-2003-523014 discloses a technique for generating grid lines in accordance with parameters indicating, for example, a number of characters, font type, and font size. JP-A-2006-189989 discloses a technique for selecting a grid as a target to which an object is snapped when an object is dragged by use of a mouse. JP-A-64-17156 and JP-A-3-269678 disclose a system in which a user selects a desired grid line from plural grid lines, and a system capable of setting up a desired grid line.

According to the technique disclosed in JP-A-2003-523014, users are required to input parameters in order to generate a grid line. The techniques disclosed in JP-A-2003-523014, JP-A-64-17156, and JP-A-3-269678 give rise to a problem that grid lines that are suitable for creating a balanced or aesthetically pleasing layout are difficult to select. Further, the technique disclosed in JP-B-2006-189989 is not effective in improving aesthetic appearance of a layout, although this technique can smooth movement of objects.

SUMMARY

In contrast, the present invention relates to a technique for generating grid lines which are suitable for automatically creating a well-balanced or beautiful layout, independently of the skill-level of or experimental trial-and-error carried out by users.

According to one aspect of the invention, there is provided a document edit support device including: an object obtaining unit that obtains an object as data expressing at least one of a text and an image, which are included in a document as an edit target and are to be located in a layout area; a grid line obtaining unit that obtains a plurality of grid lines in the layout area; and a grid line selection unit that selects at least one of the plurality of grid lines selected by the grid line obtaining unit, so that a predetermined condition is satisfied by blank spaces which remain when the object obtained by the object obtaining unit is located along the selected at least one of the plurality of grid lines.

The document edit support device configured as described above is capable of selecting a grid line depending on a blank space.

Alternatively, the document edit support device may be configured so that a grid line generation unit generates a plurality of grid lines, each being a line which divides a space defined between two mutually parallel reference lines, at a golden ratio, the reference lines being determined based on at least one of a shape or position of the object and a shape of the layout area, and the grid line obtaining unit obtains the plurality of grid lines generated by the grid line generation unit.

According to the document edit support device, a grid line is selected from a plurality of thus generated golden grid lines.

Alternatively, the document edit support device may be configured so that the grid line selection unit selects the at least one grid line so that one of the blank spaces, which remains in a range between the object and a center line of the layout area, is larger than another one of the blank spaces, which remains outside the range.

According to the document edit support device, a grid line is selected so that one of the blank spaces is larger than another one of the blank spaces.

Alternatively, the document edit support device may be configured so that the predetermined condition is that, when the object is located, a ratio between the blank spaces respectively remaining in upward and downward directions from the object or in leftward and rightward directions from the object falls within a range which is determined in advance with reference to a predetermined ratio.

According to the document edit support device, a grid line which is selected so that a ratio between blank spaces falls within a range determined in advance.

Alternatively, the document edit support device may be configured so that the predetermined condition is that, when the object is located, a ratio between blank spaces respectively remaining in upward and downward directions from the object or in leftward and rightward directions from the object is closest to a predetermined ratio.

According to the document edit support device, a grid line is selected in such a manner that a ratio between blank spaces is closest to a ratio which is determined in advance.

Further alternatively, the document edit support device may be configured so that the predetermined ratio is approximately a golden ratio, or $1:\sqrt{2}$.

According to the document edit support device, a grid line is selected in such a manner that a ratio between blank spaces is closest to a golden ratio, or $1:\sqrt{2}$.

Alternatively, the document edit support device may be configured so that the document includes a plurality of objects other than the object, each of the object and the plurality of other objects having attribute information indicating an attribute of itself, and the grid line selection unit selects the at least one of the plurality of grid lines, based on the attribute information.

According to the document edit support device, a grid line is selected so that the closer a blank space is to the center line, the larger the blank space is.

Further alternatively, the document edit support device may be configured so that the attribute information indicates an object type, and the grid line selection unit selects a grid line which reduces a distance between the object and one of the plurality of other objects, which is of the same object type as the object.

According to the document edit support device, a grid line is selected based on attribute information of an object.

Alternatively, the document edit support device may be configured so that a location of the object is determined in accordance with the selected at least one of the plurality of grid lines.

According to The document edit support device, a grid line is selected such that a blank space closer to another object of the same type has a smaller blank space.

Alternatively, the document edit support device may be configured so as to further include a location unit that determines location of the object in accordance with the at least one of the plurality of grid lines selected by the grid line selection unit.

According to the document edit support device, an object is located in accordance with a selected grid line.

According to another aspect of the invention, there is provided a program causing a computer device to execute a process, the process including: obtaining an object as data expressing at least one of a text and an image, which are included in a document as an edit target, the object to be located in a layout area; obtaining a plurality of grid lines in the layout area; and selecting at least one of the generated plurality of grid lines, so that a predetermined condition is satisfied by blank spaces which remain when the obtained object is located along the selected at least one of the plurality of grid lines.

According to still another aspect of the invention, there is provided a storage medium storing the program.

According to the program configured as described above, a grid line is selected depending on a blank space.

BRIEF DESCRIPTION OF THE DRAWINGS

Embodiments of the invention will be described in detail based on the following figures, wherein.

DESCRIPTION OF EXEMPLARY EMBODIMENTS

1. Structure

Figure 1:
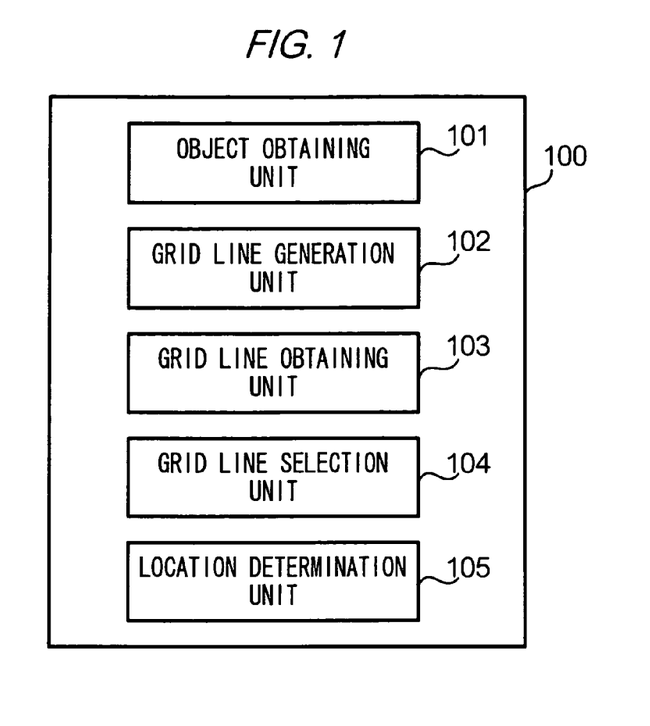
FIG. 1 shows a functional structure of a document edit device 100 according to an embodiment.

FIG. 1 shows a functional structure of a document edit device 100 according to an exemplary embodiment of the invention. The document edit device 100 has a function of editing a document and a function of supporting edit of a document. The latter function is subsidiary to the former function. The document edit device 100 is designed particularly to determine a location of an object as a processing target (hereinafter a "target object"). The term "document" refers to data including at least one object and layout information, the object being located in a layout area and the layout information indicating the location of the object in the layout area. Alternatively, the term "document" refers to a resultant which is output based on the data. The term "object" refers to data expressing at least one of a text (character string) and an image, or refers to a text or image expressed by the data. A "layout area" refers to a physical boundary of a document to be output. The "layout area" refers to, for example, one or plural paper sheets on which a document is printed, or one page, plural pages, or a partial area or partial printable area of each page.

An object obtaining unit 101 obtains an object included in a document as an edit target. A grid line generation unit 102 generates plural grid lines for a layout area. The grid line obtaining unit 103 then obtains the plural generated grid lines. A grid line selection unit 104 selects at least one of the plural grid lines. At this time, the at least one grid line is selected so that, when the object is located in accordance with the grid line, blank spaces remain to satisfy a predetermined condition. A location determination unit 105 determines the location of the object in accordance with the at least one selected grid line.

Figure 2:
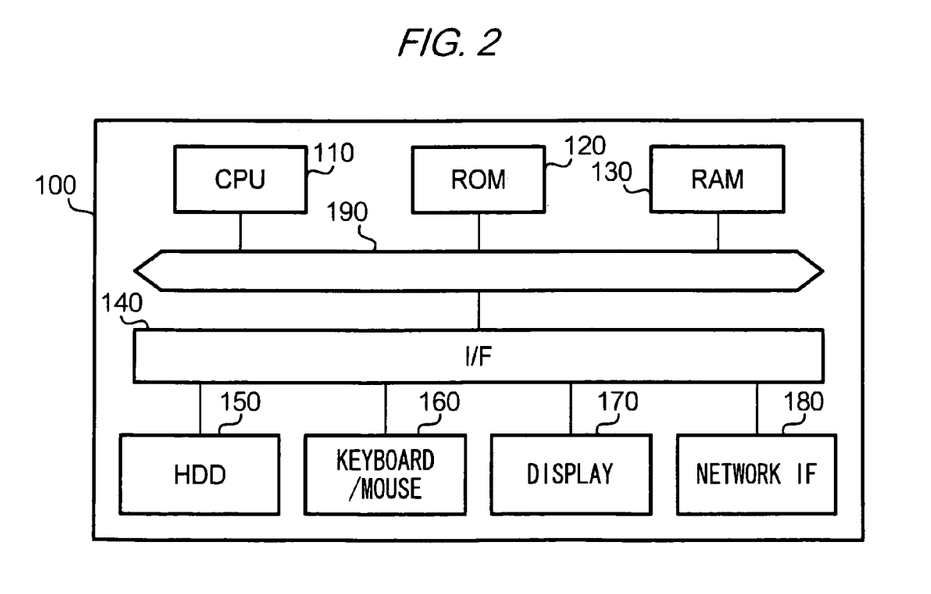
FIG. 2 shows a hardware structure of the document edit device 100.

FIG. 2 shows a hardware structure of the document edit device 100. A CPU (Central Processing Unit) 110 is a control device which controls components forming the document edit device 100. A ROM (Read Only Memory) 120 is a storage device which stores data and programs required for starting up the document edit device 100. A RAM (Random Access Memory) 130 is a storage device which functions as a work area when the CPU 110 executes programs. An I/F (Interface) 140 is an interface which allows data and control signals to be input/output from/to various input/output devices and storage devices. A HDD (Hard Disk Drive) 150 is a storage device which stores various programs and data. In this embodiment, the HDD 150 stores a document edit program for generating grid lines. A keyboard/mouse 160 is an input device with which users input instructions to the document edit device 100. A display 170 is an output device which displays content of data and/or a state of processing. In this embodiment, the display 170 shows objects, layout areas, and grid lines. A network IF 180 is an interface for transmitting/receiving data to/from other devices connected via a network (which is omitted from the figure). The document edit device 100 is capable of receiving documents (more specifically, electronic data) via a network and the network IF 180. The CPU 110, ROM 120, RAM 130, and I/F 140 are connected via a bus 190. As the CPU 110 executes a document edit program, the functional structure shown in FIG. 1 is established in the document edit device 100. The document edit device 100 may be any device that includes the functional structure shown in FIG. 1 and the hardware structure shown in FIG. 2. For example, the document edit device 100 may be a so-called personal computer. Alternatively, the document edit device 100 may be an image forming device such as a printer. The hardware structure shown in FIG. 2 may be partially omitted.

2. Operation

Figure 3:
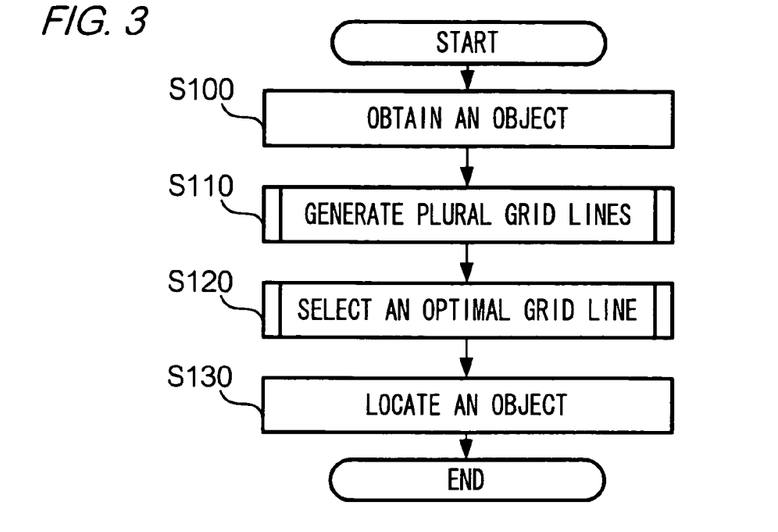
FIG. 3 is a flowchart showing operation of the document edit device 100.

FIG. 3 is a flowchart showing operation of the document edit device 100. In a step S100, the CPU 110 obtains an object. In this embodiment, the CPU 110 obtains, as an object, a document as an edit target (hereinafter a "target document"). The HDD 150 stores documents. The CPU 110 reads out a document from the HDD 150.

Figure 4:
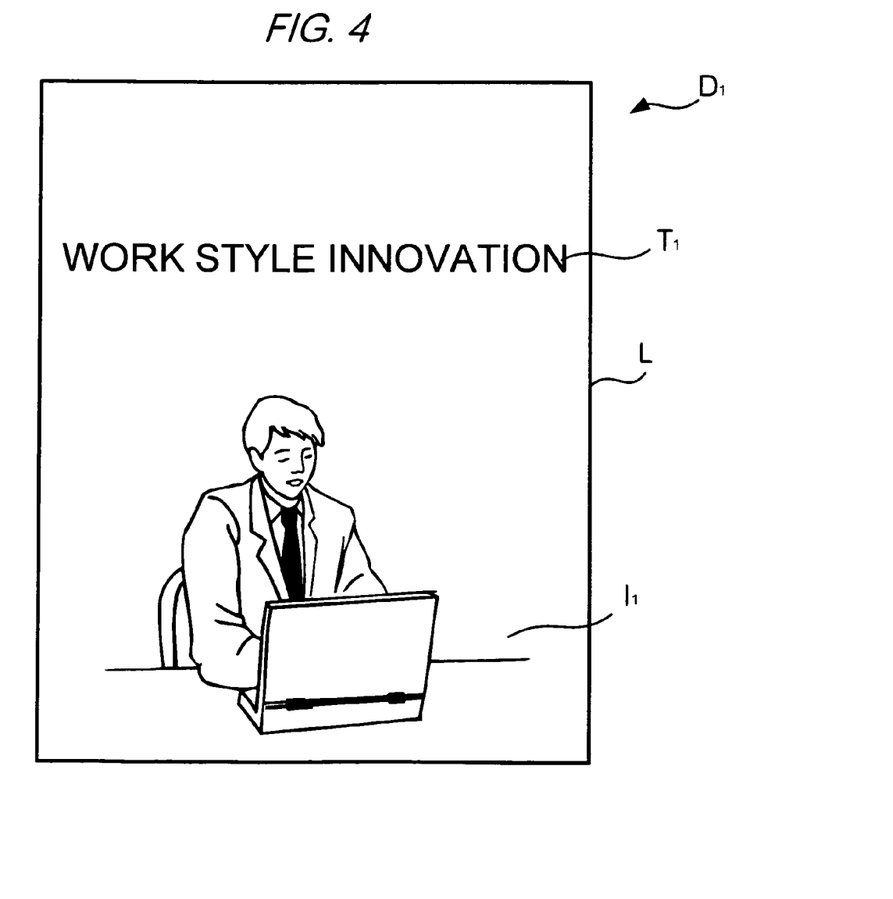
FIG. 4 shows an example of an obtained document.

FIG. 4 shows an example of an obtained document. A document $D_1$ includes objects $T_1$ and $I_1$ in a layout area L. The object $T_1$ includes a character string "work style innovation" and has attributes of the character string. The object $T_1$ has, as attributes, information indicating an object type "text" and a size of the object. The object $I_1$ includes an image and attributes of the image. The object $I_1$ includes, as attributes, information indicating an object type "image" and a size of the object. The document $D_1$ includes information indicating a location of the object within the layout area L (hereinafter "layout information"). In this embodiment, the object $T_1$ is the target object.

Referring again to FIG. 3, the CPU 110 generates plural grid lines in a step S110. In this embodiment, each grid line divides a space defined between two reference lines, at a golden ratio (hereinafter a "golden grid line"). The "golden ratio" refers to a ratio (approximately 1:1.618) expressed by the following equation (1). The left and right terms of the equation (1) are exchangeable with each other.

$$1 : \frac{1 + \sqrt{5}}{2} \quad (1)$$

Figure 5:
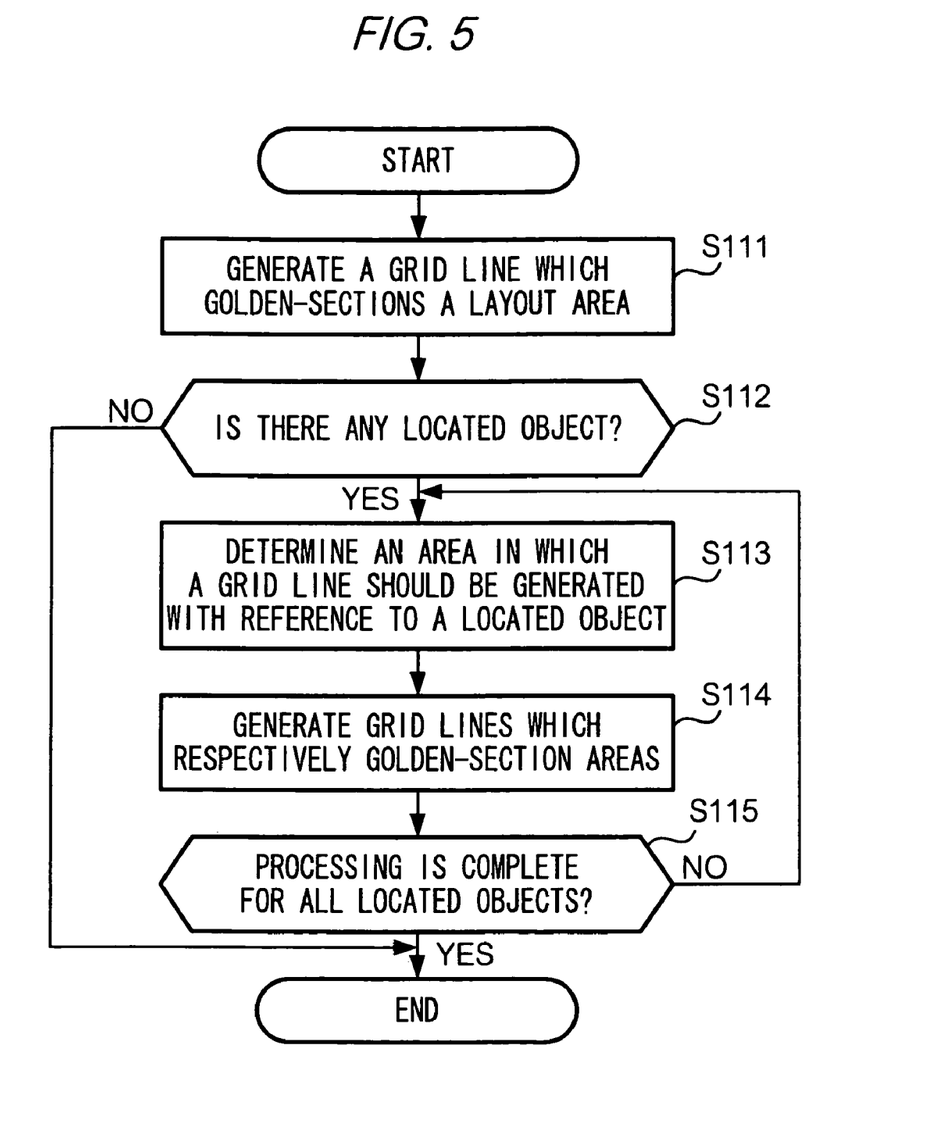
FIG. 5 shows details of a grid line generation processing.

FIG. 5 is a flowchart showing details of a grid line generation processing. In a step S111, the CPU 110 generates grid lines each of which divides a layout area at a golden ratio. Details will now be described below. The CPU 110 specifies two mutually parallel reference lines for each grid line. It is determined in advance which two lines are to be the reference lines. In this example, upper and lower edges of the layout area as well as left and right edges are used as pairs of reference lines. Firstly, the CPU 110 specifies the upper and lower edges of a layout area L to be reference lines. The CPU 110 generates a golden section line which divides a space defined between the two reference lines at the golden ratio. Secondly, the CPU 110 specifies the left and right edges of the layout area L to be reference lines, and further generates another golden section line. Grid lines are generated in this manner. The expression to "generate a grid line" is intended to mean to calculate parameters which are required to specify a grid line, such as coordinates of a reference point and a direction vector of a line. Grid lines do not always need to be shown on the display 170.

In a step S112, the CPU 110 determines whether or not the document $D_1$ includes any located object. A "located" object refers to an object whose location has been determined, i.e., any object other than a target object. If it is determined that a located object exists (S112: YES), the CPU 110 forwards the processing to a step S113. If it is determined that no located object exists (S112: NO), the CPU 110 terminates the processing shown in FIG. 5. In this example, since the document $D_1$ has one object $I_1$ other than a target object, the CPU 110 shifts the processing forward to the step S113.

In the step S113, the CPU 110 determines an area where grid lines are to be generated, referring to the located object. If there are plural located objects, the CPU 110 selects one of the plural located objects and performs the following processing on the selected one of the located objects. It is determined in advance which lines are to be used as reference lines. In this example, upper, lower, left, and right edges of a rectangle circumscribed to the one located object (hereinafter simply referred to as upper, lower, left, and right edges of the object) are used as reference lines. Firstly, the CPU 110 specifies an upper edge of the located object, which is the object $I_1$ in this example, to be a primary reference line. The CPU 110 further searches for a secondary reference line in a predetermined direction relative to the determined primary reference line, e.g., in an upward direction in relation to the upper edge. Candidates for the secondary reference line for the upper edge of the located object may be an upper edge of the layout area and a lower edge of any other located object. After detecting a secondary reference line, the CPU 110 determines an area defined between the primary and secondary reference lines. The CPU 110 further performs the same processing as described above, for each of the lower, left, and right edges as a primary reference line. Data indicating a primary reference line, a direction to search for a secondary reference line (hereinafter a "search direction"), and candidates for a secondary reference line are stored in the HDD 150. For example, the HDD 150 stores a search direction "upward direction" and candidate lines "upper edge of a layout area" and "lower edge of one other located object" for a reference line "upper edge", as well as a search direction "downward direction" and candidate lines "lower edge of a layout area" and "upper edge of one other located object" for a reference line "lower edge". The HDD 150 also stores a search direction "rightward direction" and candidate lines "right edge of a layout area" and "left edge of one other located object" for a reference line "right edge", as well as a search direction "leftward direction" and candidate lines "left edge of a layout area" and "right edge of one other located object" for a reference line "left edge".

In a step S114, the CPU 110 generates grid lines which respectively divide areas by golden sectioning. That is, the CPU 110 stores into the RAM 130 identifiers of grid lines and parameters required for specifying the grid lines. In a step S115, the CPU 110 determines whether the processing is complete for all located objects. If any located object is determined to remain incomplete for the processing (S115: NO), the CPU 110 changes the located object as a processing target, and shifts the processing to the step S113. If the processing is complete for all located objects (S115: YES), the CPU 110 terminates the processing shown in FIG. 5.

Figure 6:
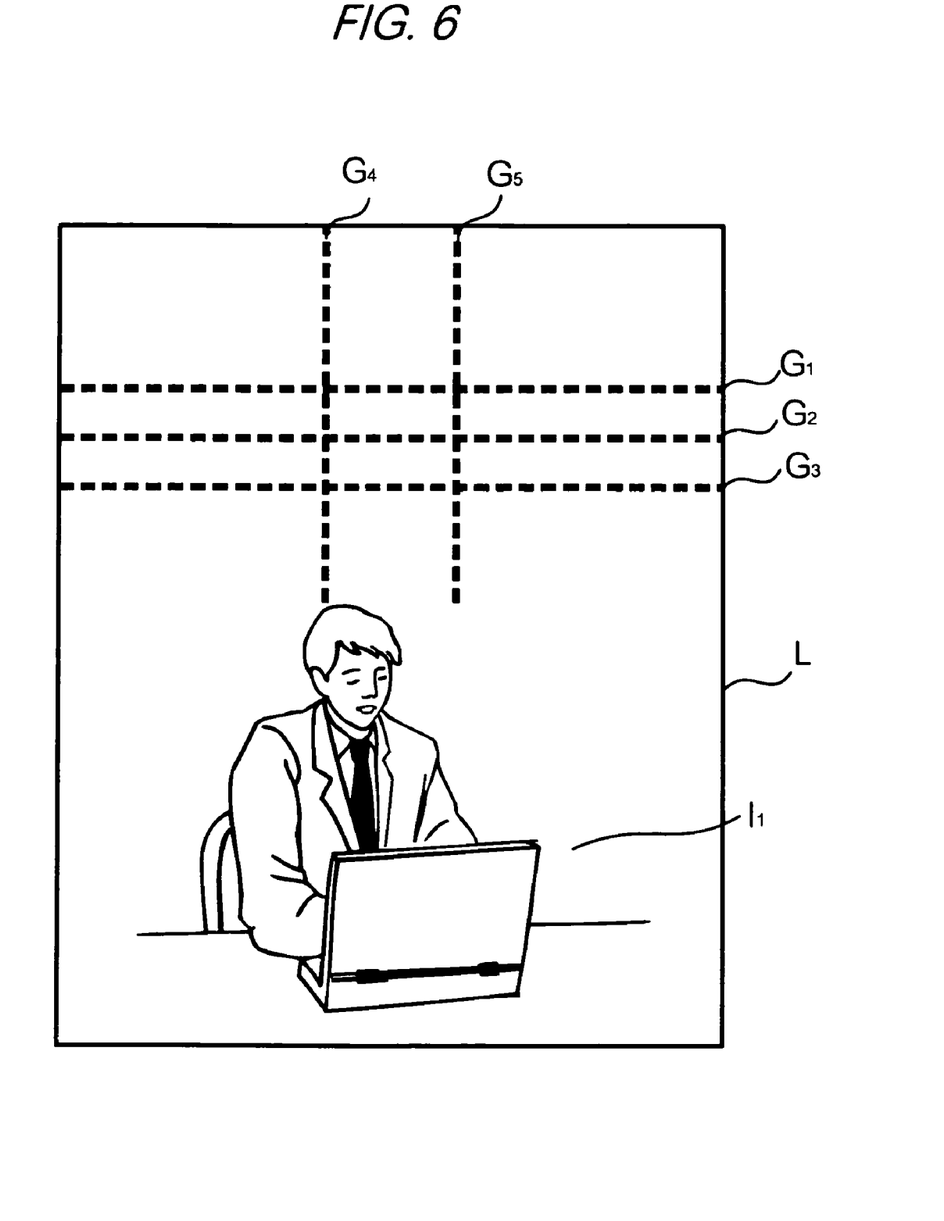
FIG. 6 shows an example of generated grid lines.

FIG. 6 shows an example of generated grid lines. A grid line $G_1$ divides a space defined between the upper edges of the layout area L and the object $I_1$, at 1:1.618. A grid line $G_2$ divides a space defined between the upper and lower edges of the layout area L, at 1:1.618. A grid line $G_3$ divides a space defined between the upper edge of the layout area L and the upper edge of the object $I_1$, at 1.618:1. A grid line $G_4$ divides a space defined between the left and right edges of the layout area L, at 1:1.618. A grid line $G_5$ divides a space defined between the left and right edges of the layout area L, at 1.618:1. For ease of explanation, grid lines other than grid lines $G_1$ to $G_5$ are omitted from the figure.

Referring again to FIG. 3, the CPU 110 selects an optimal grid line from plural grid lines, in a step S120.

Figure 7:
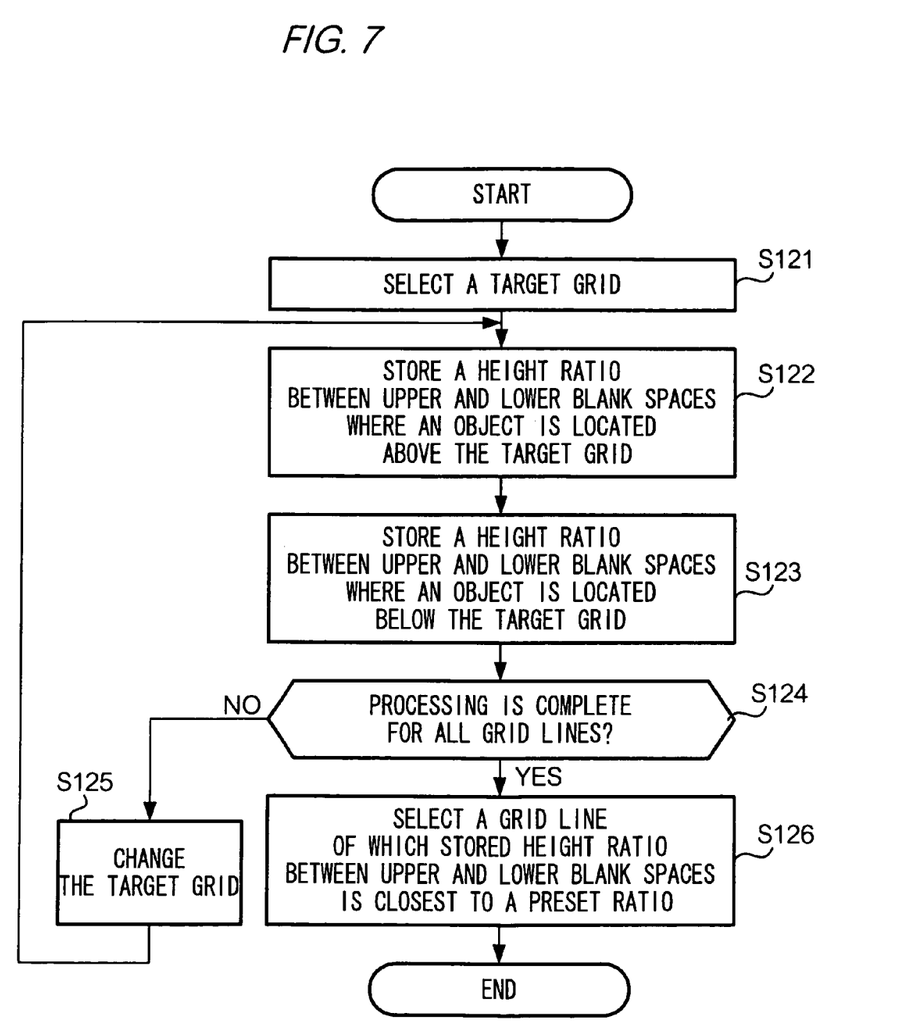
FIG. 7 is a flowchart showing details of a grid line selection processing.

FIG. 7 is a flowchart showing details of a grid line selection processing. In a step S121, the CPU 110 selects a grid line as a processing target (hereinafter a "target grid line"). The CPU 110 selects one grid line after another in an order starting with a grid line having the earliest identifier.

In a step S122, the CPU 110 calculates a ratio r between blank spaces remaining in upward and downward directions from a target object when the target object is located above a target grid line. The CPU 110 stores the calculated ratio r into the RAM 130, along with an identifier of the grid line and information indicating a positional relationship between the object and the grid line.

In a step S123, the CPU 110 calculates a ratio r between blank spaces respectively remaining in upward and downward directions from a target object when the target object is located below a target grid line. The CPU 110 stores the calculated ratio r into the RAM 130, along with an identifier of the grid line and information indicating a positional relationship between the object and the grid line.

Figure 8A:
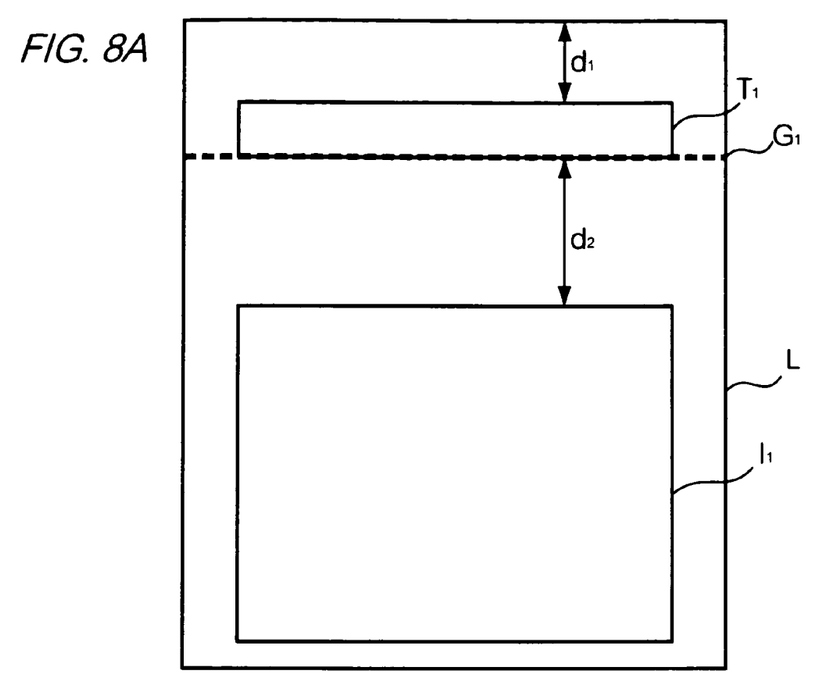
FIGS. 8A and 8B each show a positional relationship between a target object and a target grid line.
Figure 8B:
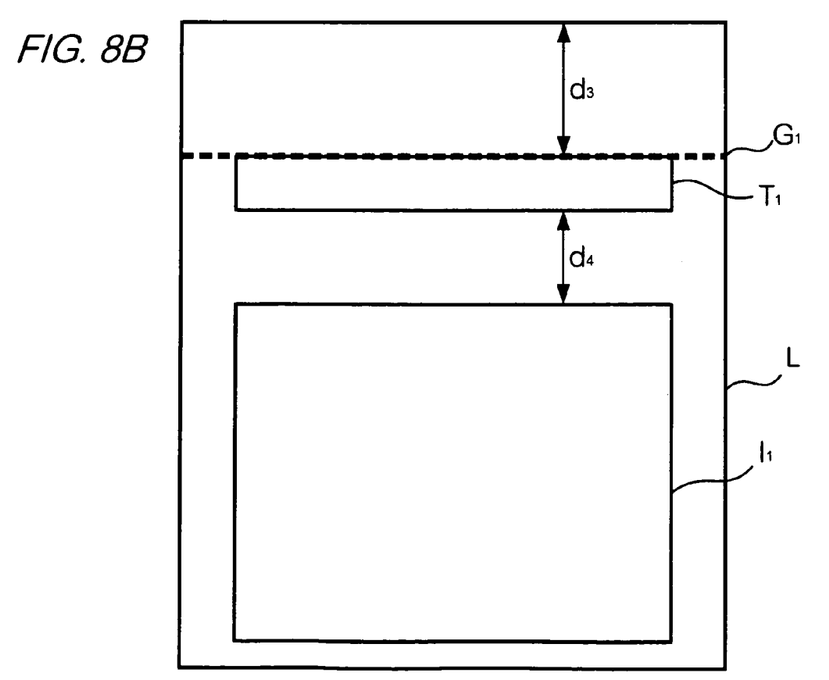

FIGS. 8A and 8B show positional relationships between the target object and the target grid line. In these examples, the grid line $G_1$ is a target grid line. FIG. 8A shows an example in which an object $T_1$ is located above the grid line $G_1$. FIG. 8B shows an example in which an object $T_1$ is located below the grid line $G_1$. Being "above a target grid line" specifically refers to a state that the lower edge of a target object is in contact with a target grid line. Being "below a target grid line" specifically refers to a state that the upper edge of the target object is in contact with the target grid line.

The term "blank space" is defined as a minimum distance between an object and one other object or a boundary of a layout area in a direction. In the example of FIG. 8A, a distance $d_1$ between an upper edge of an object $T_1$ and an upper edge of a layout area L is a blank space remaining in an upward direction from the object $T_1$. A distance $d_2$ between a lower edge of the object $T_1$ and an upper edge of the object $I_1$ is a blank space remaining in a downward direction from the object $T_1$. In the example of FIG. 8B, a distance $d_3$ between the upper edge of the object $T_1$ and an upper edge of the layout area L is a blank space remaining in an upward direction from the object $T_1$. A distance $d_4$ between lower edge of the object $T_1$ and the upper edge of the object $I_1$ is a blank space remaining in a downward direction from the object $T_1$.

Referring again to FIG. 7, the CPU 110 determines whether or not processing is complete for all grid lines, in a step S124. If any grid line is determined to remain incomplete for the processing (S124: NO), the CPU 110 changes the target grid line to a next grid line, in a step S125. After changing the target grid line, the CPU 110 shifts the processing to a step S122.

If the processing is determined to be complete for all grid lines (S124: YES), the CPU 110 determines that a grid line and a positional relationship which minimize the difference between a ratio r and a predetermined ratio $r_{ref}$ should be used for subsequent processing.

Referring again to FIG. 3, the CPU 110 determines a location of the target grid line in accordance with a selected grid line, in a step S130. That is, the CPU 110 determines a location of the target object so that a positional relationship with the grid line complies with a positional relationship determined in the step S126. The CPU 110 updates layout information in accordance with the determination.

Figure 9:
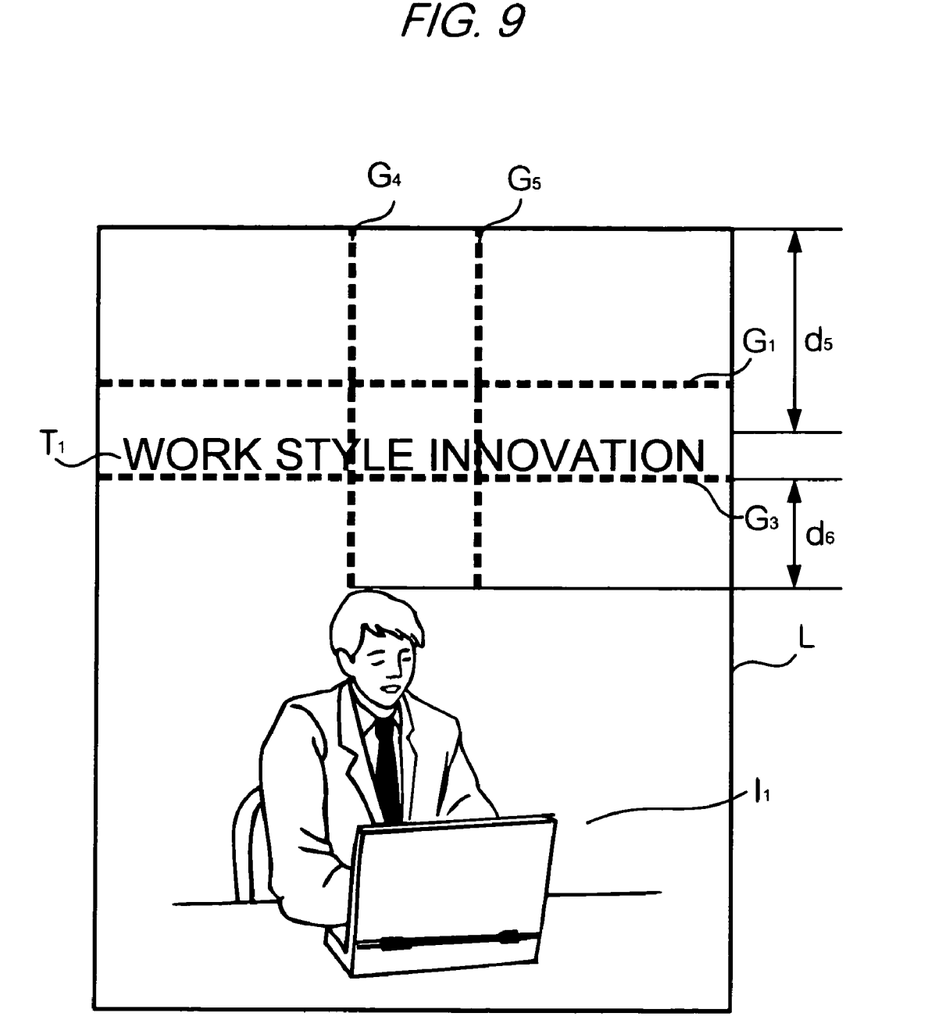
FIG. 9 shows an example of an edited document.

FIG. 9 shows an example of an edited document. In this example, an object $T_1$ is located above a grid line $G_3$. A blank space left in the upward direction from the object $T_1$ is $d_5$, and a blank space left in the downward direction is $d_6$. A golden ratio is used as the ratio $r_{ref}$. That is, $r_{ref}=1.618$ is given. Among a number of possible combinations of grid lines and positional relationships, the ratio $r=d_5/d_6$ shown in the figure is the closest to the $r_{ref}$.

As has been described above, a target object is located so that the ratio between blank spaces approximates to the golden ratio.

3. Further Embodiments

The invention is not limited to the above embodiments but may be variously modified in practice. From descriptions given below, matters which are common to the above embodiment will be omitted. Elements common to the above embodiments will be respectively denoted by common reference numerals in the following descriptions. Two or more of the following modifications may be combined in use.

3-1. Modification 1

Figure 10:
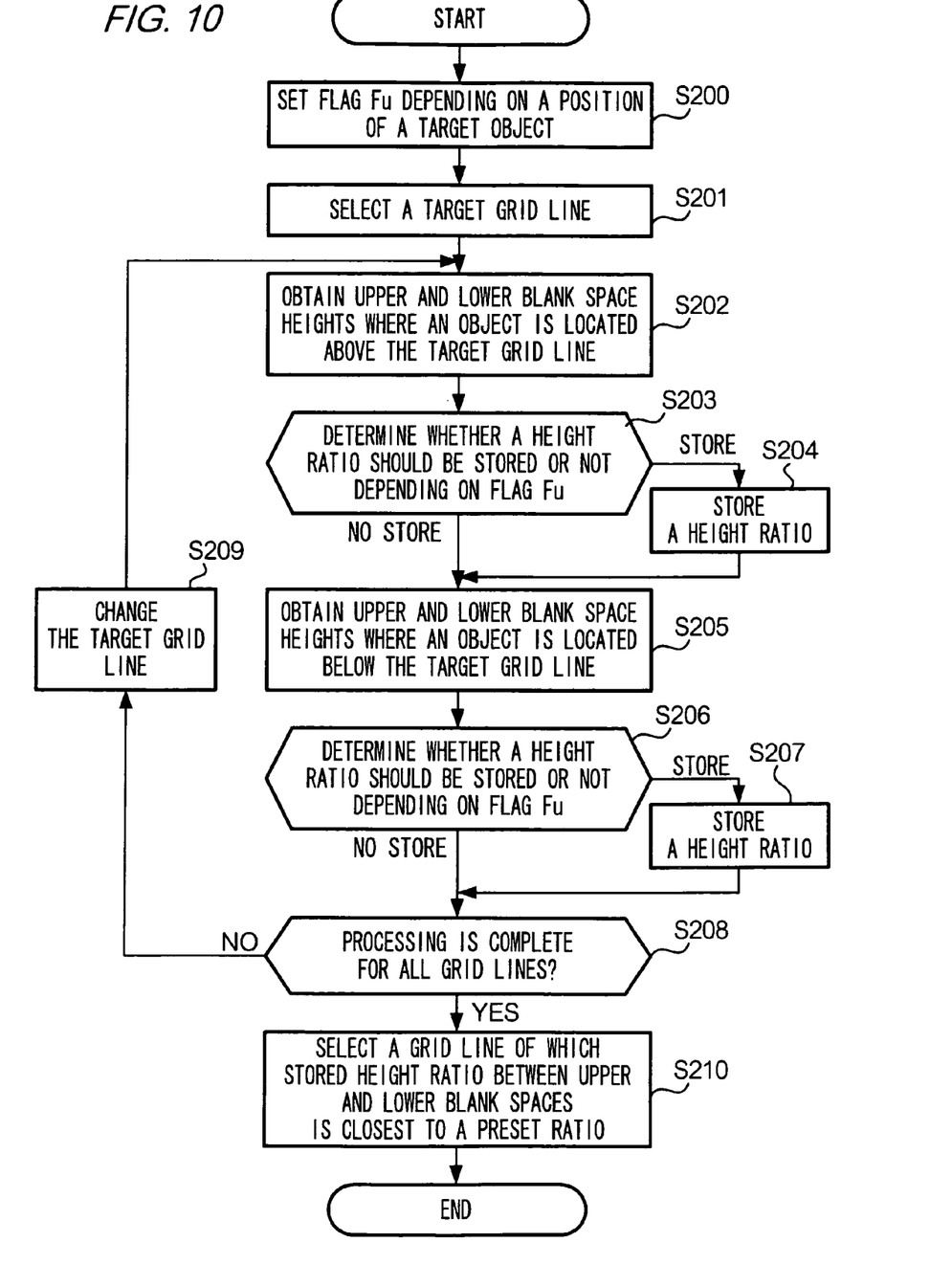
FIG. 10 is a flowchart showing a grid line selection processing according to Modification 1.

FIG. 10 is a flowchart showing a grid line selection processing according to Modification 1. In Modification 1, the processing flow shown in FIG. 10 is used in place of the processing flow shown in FIG. 7. According to the processing flow shown in FIG. 10, a grid line is selected depending on the position of a target object.

In the step S200, the CPU 110 sets a value for a flag Fu. The flag Fu indicates a position of the target object within the layout area. If the target object is located in the upper half of the layout area L, i.e., if the target object is located higher than the center line in the horizontal direction, the CPU 110 sets a value Fu=1 for the flag Fu. In the other cases, the CPU 110 sets a value Fu=0 for the flag Fu. In a step S201, the CPU 110 selects one of plural grid lines.

In a step S202, the CPU 110 calculates a ratio r between blank spaces respectively remaining in upward and downward directions from a target object when the target object is located above a target grid line. In a step S203, the CPU 110 determines a next processing. If the value of the flag Fu is "1" and if the downward one of blank spaces respectively remaining in upward and downward directions from the target object is larger than the upward one, the CPU 110 stores the calculated ratio r into the RAM 130, along with an identifier of a grid line and information indicating a positional relationship between an object and the grid line, in a step S204. If the value of the flag Fu is "0" and if the upward one of blank spaces respectively remaining in upward and downward directions from the target object is larger than the downward one, the CPU 110 also stores the calculated ratio r into the RAM 130, along with an identifier of a grid line and information indicating a positional relationship between an object and the grid line, in the step S204. In cases other than those described above, the CPU 110 shifts the processing to a step S205 without storing the calculated ratio r.

In a step S205, the CPU 110 calculates a ratio r between blank spaces respectively remaining in upward and downward directions from a target object when the target object is below a target grid line. In a step S206, the CPU 110 determines a next processing in accordance with the value of the flag Fu. If the value of the flag Fu is "1" and if the downward one of blank spaces respectively remaining in upward and downward directions from the target object is larger than the upward one, the CPU 110 stores the calculated ratio r into the RAM 130, along with an identifier of a grid line and information indicating a positional relationship between the object and the grid line. If the value of the flag Fu is "0" and if the upward one of blank spaces respectively remaining in upward and downward directions from the target object is larger than the downward one, the CPU 110 stores the calculated ratio r into the RAM 130, along with an identifier of a grid line and information indicating a positional relationship between the object and the grid line. In cases other than those described above, the CPU 110 shifts the processing to a step S208 without storing the calculated ratio r.

In the step S208, the CPU 110 determines whether or not the processing is complete for all grid lines. If any grid line is determined to remain incomplete for the processing (S208: NO), the CPU 110 changes the target grid line to a next grid line. After changing the target grid line, the CPU 110 shifts the processing to the step S202.

If the processing is determined to be complete for all grid lines (S208: YES), the CPU 110 determines that a grid line and a positional relationship which minimize difference between a ratio r and a predetermined ratio $r_{ref}$ should be used for subsequent processing.

Figure 11:
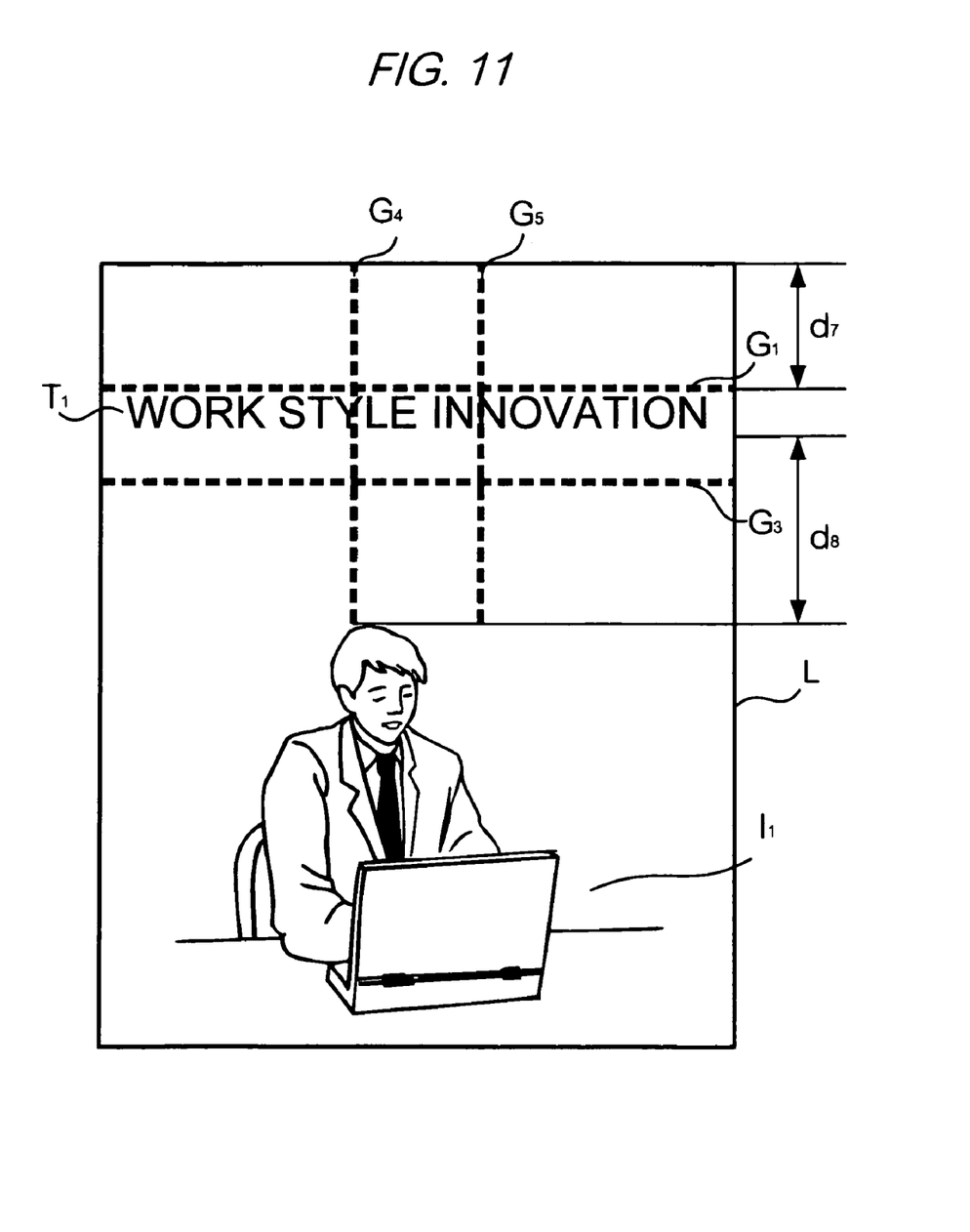
FIG. 11 shows an example of an edited document.

FIG. 11 shows an example of an edited document. In this example, an object $T_1$ is located below a grid line $G_1$. An upward blank space remaining in an upward direction from the object $T_1$ is $d_7$, and a downward blank space remaining in a downward direction is $d_8$. A golden ratio is used as a ratio $r_{ref}$. That is, $r_{ref}=1/1.618=0.618$ is given. Among a number of possible combinations of grid lines and positional relationships, this ratio $r=d_7/d_8$ is the closest to the $r_{ref}$. Since the object $T_1$ is located in the upper half of the layout area L, the object $T_1$ is located so that the blank space below the object $T_1$ is larger than the upward blank space.

According to this Modification 1, an optimal grid line is selected depending on the location of an object.

The flow of the processing as described above is not limited to that shown in FIG. 10. The processing may be executed by whatever flow causes conditions for selecting a grid line to vary depending on the location of a target object.

3-2. Modification 2

Figure 12:
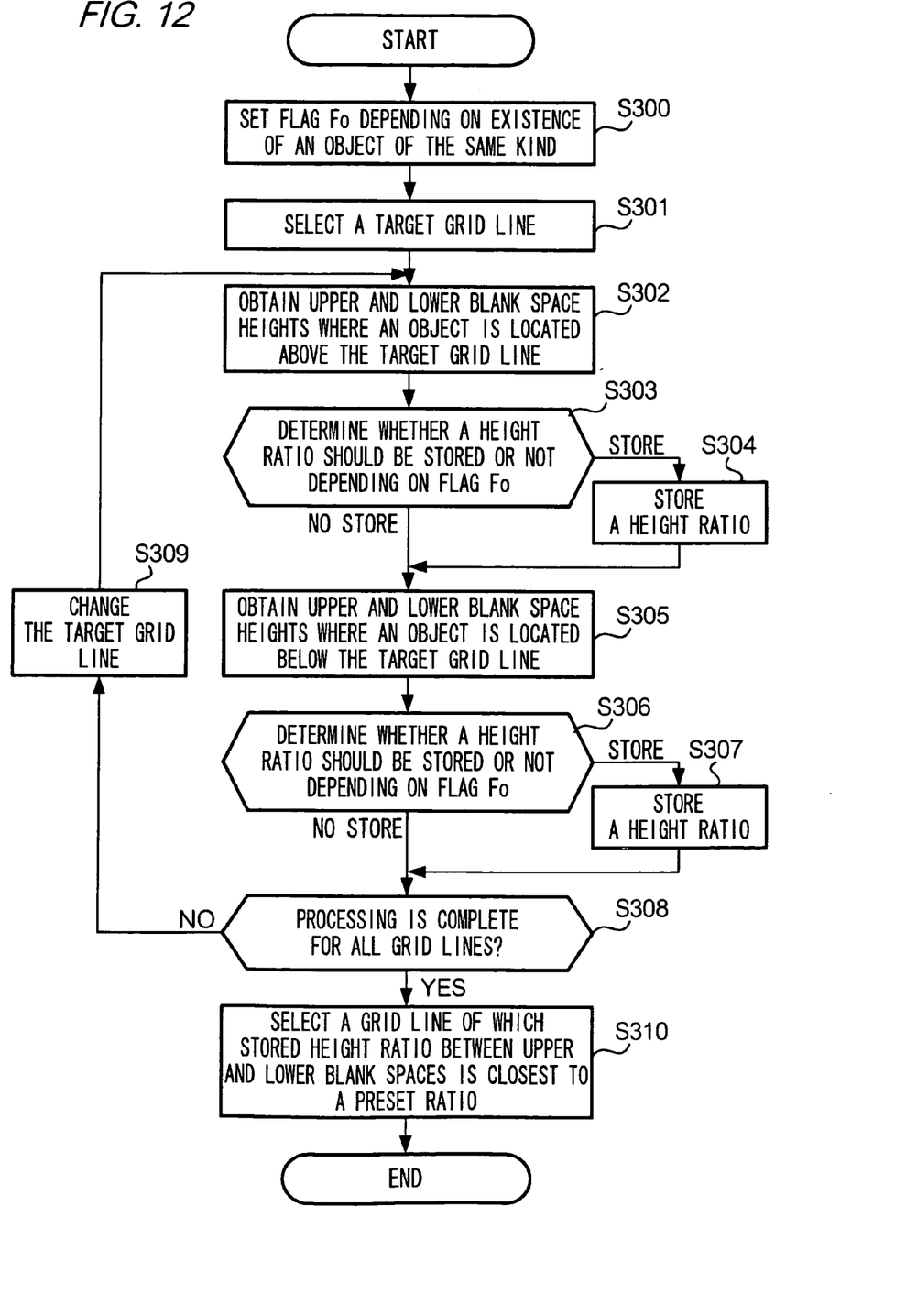
FIG. 12 is a flowchart showing a grid line selection processing according to Modification 2.

FIG. 12 is a flowchart showing a grid line selection processing according to Modification 2. In Modification 2, the processing flow shown in FIG. 12 is used in place of the processing flow shown in FIG. 7. According to the processing flow of FIG. 12, a grid line is selected depending on attributes of a closest object (in particularly, the type of an object). The term "closest object" is intended to mean an object which is least distant from a target object.

In a step S300, the CPU 110 sets a value for a flag Fo. The flag Fo indicates a type of a closest object. If the closest object is above a target object and if the type of the closest object is the same as the target object, the CPU 110 sets a value Fo=1 for the flag Fo. If the closest object is below a target object and if the type of the closest object is the same as the target object, the CPU 110 sets a value Fo=−1 for the flag Fo. If the type of the closest object differs from that of the target object, the CPU 110 sets a value Fo=0 for the flag Fo. In a step S301, the CPU 110 selects one target grid line from plural grid lines. That is, the flag Fo is set depending on existence of an object of the same type as a target object.

In a step S302, the CPU 110 calculates a ratio r between blank spaces respectively above and below a target object when a target object is located above a target grid line. In a step S303, the CPU 110 determines a next processing depending on the value of the flag Fo. If the value of a flag Fo is "1" and if the downward one of the blank spaces respectively remaining in upward and downward directions from a target object is larger than the upward one, the CPU 110 stores a calculated r into the RAM 130, along with an identifier of a grid line and information indicating a positional relationship between the object and the grid line, in a step S304. If the value of a flag Fo is "1" and if the upward one of the blank spaces remaining in upward and downward directions from a target object is larger than the downward one, the CPU 110 stores a calculated r into the RAM 130, along with an identifier of a grid line and information indicating a positional relationship between the object and the grid line, in a step S304. If the value of a flag Fo is "0", the CPU 110 stores a calculated r into the RAM 130, along with an identifier of a grid line and information indicating a positional relationship between the object and the grid line, in the step S304. In cases other than those described above, the CPU 110 shifts the processing to a step S305 without storing the calculated r.

In the step S305, the CPU 110 calculates a ratio r between blank spaces above and below a target grid line when the target object is located below the target grid line. In a step S306, the CPU 110 determines a next processing depending on the value of the flag Fo. If the value of the flag Fo is "1" and if the downward one of the blank spaces respectively remaining in upward and downward directions from the target object is larger than the upward one, the CPU 110 stores the calculated r into the RAM 130, along with an identifier of a grid line and information indicating a positional relationship between the object and the grid line, in a step S304. If the value of the flag Fo is "−1" and if the upward one of the blank spaces respectively remaining in upward and downward directions from the target object is larger than the downward one, the CPU 110 stores the calculated r into the RAM 130, along with an identifier of a grid line and information indicating a positional relationship between the object and the grid line, in the step S304. If the value of the flag Fo is "0", the CPU 110 stores the calculated r into the RAM 130, along with an identifier of a grid line and information indicating a positional relationship between the object and the grid line, in the step S304. In cases other than those described above, the CPU 110 shifts the processing to a step S305 without storing the calculated r.

In a step S308, the CPU 110 determines whether or not the processing is complete for all grid lines. If any grid line is determined to be incomplete for the processing (S308: NO), the CPU 110 changes the target grid line to a next grid line. After changing the target grid line, the CPU 110 shifts the processing to a step S302.

If the processing is determined to be complete for all grid lines (S308: YES), the CPU 110 determines that a grid line and a positional relationship which minimize difference between a ratio r and a predetermined ratio $r_{ref}$ should be used for subsequent processing.

Figure 13:
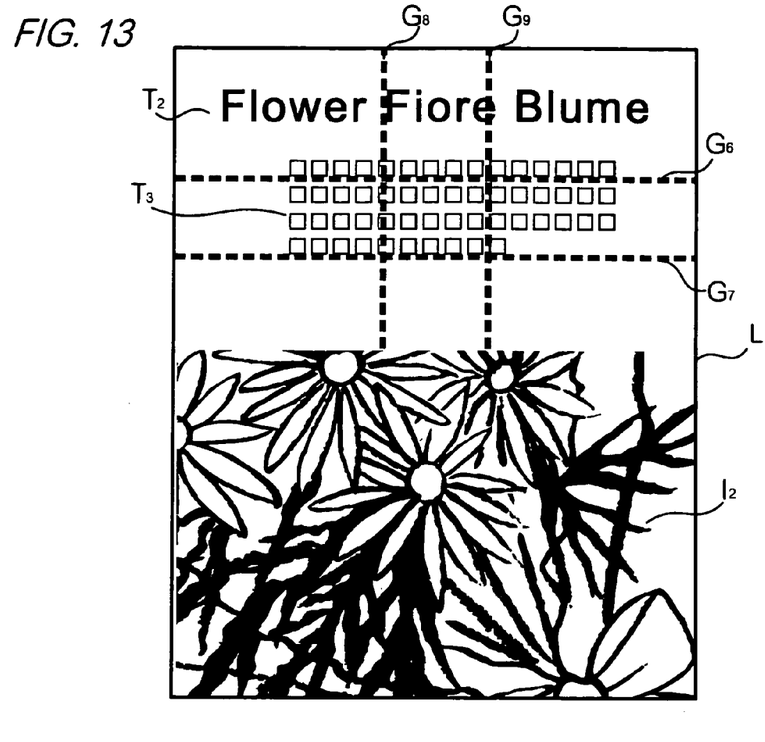
FIG. 13 shows an example of an edited document.

FIG. 13 shows an example of an edited document. In this example, an object $T_3$ is a target object. Both of objects $T_2$ and $T_3$ are text objects and are of the same type. An object $I_2$ is an image object. A grid line $G_6$ divides a blank space between the objects $T_2$ and $I_2$ at 1:1.618. A grid line $G_7$ divides a blank space between the objects $T_2$ and $I_2$ at 1.618:1. Grid lines $G_8$ and $G_9$ divide a space defined between the left and right edges of the layout area, respectively at 1:1.618 and 1.618:1. In this example, the location of the object $T_3$ is determined so that a blank space above the object $T_3$ (which is remaining in a direction to a side where an object of the same type exists) is smaller than a blank space below the object $T_3$ (remaining in a direction to a side where no object of the same type exists).

Thus, an optimal grid line is selected depending on attributes of an object, according to Modification 2.

The specific flow of the processing is not limited to that shown in FIG. 12. The processing may be executed by whatever flow causes conditions for selecting a grid line to change depending on the location of a target object. Further, the processing may be executed taking as a closest object the object which is closest to a target object in a predetermined direction.

3-3. Modification 3

A definition of "blank space" is not limited to that described in the embodiments. In the above embodiments, each blank space is regarded to be a dimension represented as a length but may also be regarded to be a dimension represented as an area. For example, (i) a blank space may be defined as a product obtained by multiplying a minimum distance in a direction between an object and another object or a boundary of a layout area by another minimum distance in a direction perpendicular to the foregoing direction between an object and another object or a boundary of a layout area. Alternatively, (ii) a blank space may be defined as an area size of a virtual ellipse which touches edges of respective ones of grouped objects, or as an area size of a virtual ellipse centered on a reference point which is determined based on objects. Still alternatively, (iii) a blank space may be defined as a virtual polygon which touches edges of respective ones of grouped objects. In brief, a blank space may be defined as a volume of whatever area is visually recognizable as a blank or vacant space.

Figure 14A:
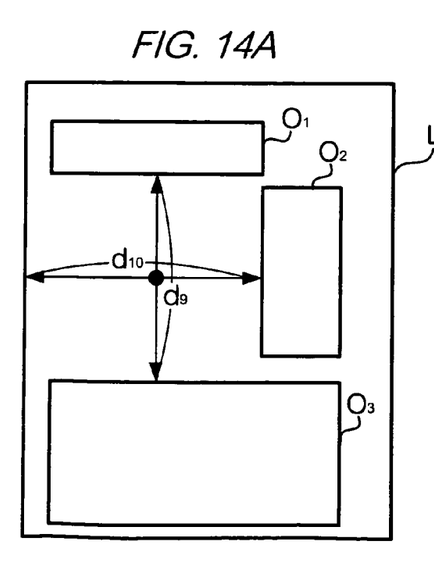
FIGS. 14A and 14B each show an example of a definition of a blank space according to Modification 3.
Figure 14B:
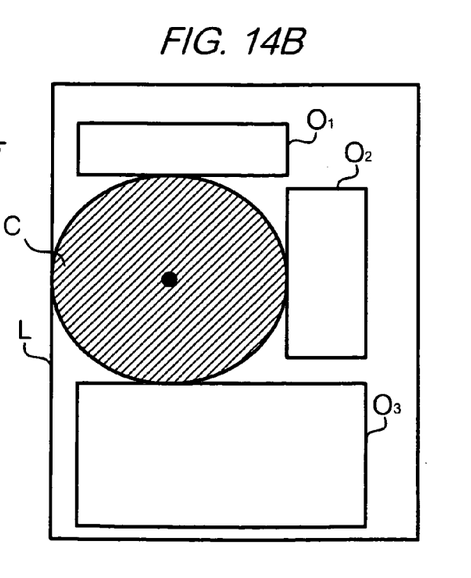

FIGS. 14A and 14B each show an example of a blank space according to Modification 3. FIG. 14A shows an example using the definition (i) described above. Consideration is now made of a blank space remaining in a downward direction from an object $O_1$. An object $O_3$ is close to an object $O_1$ in a downward direction from the object $O_1$. A distance $d_9$ is an interval between objects $O_1$ and $O_3$. A distance $d_{10}$ is an interval between an object $O_2$ and a left edge of a layout area L. In this example, the blank space is defined by $d_9 \times d_{10}$. FIG. 14B shows an example using the definition (ii) described above. An ellipse C touches edges which respectively belong to objects $O_1$ to $O_3$. In this example, a blank space is defined by the area of the ellipse C (hatched with oblique lines).

3-4. Modification 4

The above embodiments and modifications have been described with reference to a case that the predetermined ratio $r_{ref}$ is a golden ratio. However, the ratio $r_{ref}$ is not limited to the golden ratio. For example, $r_{ref} = \sqrt{2}$ or $r_{ref} = 1/\sqrt{2}$ may be used. That is, $1:\sqrt{2}$ may be used in place of the expression (1).

3-5. Modification 5

The above embodiments and modifications have been described with reference to a case of determining positions in upward and downward directions of a layout area L. However, positions may be determined in rightward and leftward directions as well. Alternatively, positions may be determined in both upward and downward directions and in rightward and leftward positions. In brief, at least one optimal grid line may be selected from among plural grid lines.

3-6. Modification 6

The document edit device 100 need not generate grid lines. In this case, the CPU 110 obtains parameters which specify grid lines, in a step S110. Parameters which specify grid lines, such as positions of and intervals between grid lines, are determined in advance. The HDD 150 stores parameters which specify grid lines. The CPU 110 specifies grid lines by reading parameters from the HDD 150. In addition, grid lines are not limited to golden grid lines. A line which divides a layout area evenly may be used as a grid line.

3-7. Modification 7

The document edit device 100 need not determine the location of any object. In a case that the location of an object is not determined by the document edit device 100, the CPU 110 outputs information indicating a selected grid line to another device. The other device then determines the location of an object in accordance with the selected grid line.

3-8. Modification 8

The grid line selected in the step S126, S210, or S310 is not limited to the grid line closest to a ratio $r_{ref}$ which is determined in advance. The CPU 110 may select a grid line corresponding to a ratio r existing within a range which is determined in advance with reference to the ratio $r_{ref}$. The CPU 110 may select a grid line corresponding to the ratio r which satisfies $r_{ref} - r_{th} \leq r \leq r_{ref} + r_{th}$. In this expression, $r_{th}$ is a threshold. If plural grid lines satisfy this condition, the CPU 110 may display a message indicating the condition on a display 170. Alternatively, the CPU 110 may select a grid line closest to the ratio $r_{ref}$ among grid lines which satisfy the condition. If there is no grid line which satisfies the condition, the CPU 110 may display the message indicating the condition on the display 170.

3-9. Other Modifications

In the step S100, the object need not always be obtained together with a target document. That is, each object and layout information need not always be obtained simultaneously from a single source. Each object and a target document may be obtained from any other device via a network and the network IF 180. Alternatively, each object and a target document may be input separately by a user operating the keyboard/mouse 160.

When a target grid line is selected from plural grid lines, grid lines as selection targets may be narrowed. For example, the CPU 110 may narrow selection targets to be only grid lines existing in a direction which is determined in advance in relation to a located object.

In the step S303 or S305, the processing which is executed in a case where the value of the flag Fo is "0" is not limited to that described in Modification 2. If the value of the flag Fo is "0", the processing described in the Modification 1 may be executed.

The number of objects and the number of target objects are not limited to those described in the above embodiments and modifications. For example, in the above embodiments and modifications only examples dealing with one target object are described. However, there may be plural target objects. In addition, objects located in accordance with a rule determined in advance, and objects located in accordance with predetermined layout information may be mixed in one document. For example, locations of objects $I_1$, $T_2$, and $I_2$ are determined in advance in the above embodiments. A location of an object T1 or T3 is determined in accordance with a grid line. Alternatively, locations of all objects included in one document may be determined by a processing described in any of the embodiments and modifications. In this case, by the processing, specifying one after another of objects as processing targets is carried out.

Attribute information which each object has is not limited to information as described in the above embodiments or modifications. For example, items available as attributes are: (1) object type (such as "text" or "image"); (2) object category (such as "title", "subtitle", "body", "main image", or "sub-image"); (3) font size; (4) font type (such as "mincho" or "gothic"); (5) font style (such as "standard", "bold", or "italic"); (6) object size (such as "area", "number of characters", or "number of pixels"); (7) object priority ("high", "middle", or "low" or any index); and (8) content of an image ("portrait", "landscape", "mountain", or "flower"). An object need not include all the attributes cited above as examples.

An object need not always have attribute information. Attributes of an object may be determined by separate data from the object, such as layout information. Alternatively, attributes of an object may be determined in advance.

In the above embodiments and modifications, data, information, parameters, and the like which are stored in the HDD 150 may be stored in a device other than the HDD 150. For example, design rules may be stored in a device other than the document edit device 100. In this case, the document edit device 100 obtains design rules from another device by communication or direct connection with the other device via a network. In this case, the document edit device 100 need not store design rules in advance. Alternatively, data, information, parameters, and the like may be input by users.

In the above embodiments and modifications, data, information, or parameters which are "predetermined" or "determined in advance" may be determined in accordance with instructions input by users. Alternatively, such data, information, parameters, and the like may be determined in accordance with predetermined algorithms by the CPU 110.

In the above embodiments and modifications, the document edit program is stored in the HDD 150. However, the document edit program may be provided by a storage medium such as a CD-ROM (Compact Disk Read Only Memory).

What is claimed is:

1. A document edit support device comprising:
   a processor, and
   a memory operably connected to the processor, and storing
      a predetermined ratio, wherein the processor is configured to obtain an object as data expressing at least one of a text and an image, which are included in a document as an edit target and are to be located in a layout area;

the processor is further configured to obtain a plurality of grid lines in the layout area;

the processor is configured to select at least one of the obtained plurality of grid lines, so that a predetermined condition is satisfied by blank spaces which are left when the object obtained by the object obtaining unit is located along the selected at least one of the plurality of grid lines, and the predetermined condition is that, when the object is located along the selected grid line, a ratio between blank spaces respectively remaining in upward and downward directions from the object or in leftward and rightward directions from the object falls within a range which is determined in advance with reference to the predetermined ratio stored in the memory, wherein the predetermined ratio is 1:√2.

2. The document edit support device according to claim 1, wherein the processor is further configured to generate a plurality of grid lines, each being a line which divides a space defined between two mutually parallel reference lines, at a golden ratio, the reference lines being determined based on at least one of a shape or position of the object and a shape of the layout area, and the processor is further configured to obtain the generated plurality of grid lines.

3. The document edit support device according to claim 1 wherein the processor is further configured to select the at least one grid line so that one of the blank spaces, which remains in a range between the object and a center line of the layout area, is larger than another one of the blank spaces, which remains outside the range.

4. The document edit support device according to claim 1, wherein the document includes a plurality of objects other than the object, each of the object and the plurality of other objects has attribute information indicating an attribute of itself, and the processor is further configured to select the at least one of the plurality of grid lines, based on the attribute information.

5. The document edit support device according to claim 4, wherein the attribute information indicates an object type, and the processor is further configured to select a grid line which reduces a distance between the object and one of the plurality of other objects, which is of the same object type as the object.

6. The document edit support device according to claim 1, wherein the processor is further configured to determine location of the object in accordance with the at least one of the plurality of grid lines selected by the grid line selection unit.

7. A computer-readable storage medium storing a program causing a computer device having a processor and a memory storing a predetermined ratio to execute a process, the process comprising:

obtaining, by the processor, an object as data expressing at least one of a text and an image, which are included in a document as an edit target and are to be located in a layout area;

obtaining, by the processor, a plurality of grid lines in the layout area;

selecting, by the processor, at least one of the generated plurality of grid lines, so that a predetermined condition is satisfied by blank spaces which remain when the obtained object is located along the selected at least one of the plurality of grid lines, and the predetermined condition is that, when the object is located along the selected grid line, a ratio between blank spaces respectively remaining in upward and downward directions from the object or in leftward and rightward directions from the object falls within a range which is determined in advance with reference to the predetermined ratio stored in the memory, wherein the predetermined ratio is 1:√2.

\* \* \* \* \*